United States Patent [19]

Durand et al.

[11] 4,438,019

[45] Mar. 20, 1984

[54] CATALYST FOR THE POLYMERIZATION OF OLEFINS BASED UPON MAGNESIUM AND TRANSITION METAL

[75] Inventors: Daniel C. Durand; Pierre M. Mangin, both of Martigues, France

[73] Assignee: BP Chimie, Paris, France

[21] Appl. No.: 242,354

[22] Filed: Mar. 10, 1981

Related U.S. Application Data

[63] Continuation of Ser. No. 63,123, Aug. 3, 1979, abandoned, which is a continuation of Ser. No. 850,230, Nov. 11, 1977, abandoned, which is a continuation of Ser. No. 363,037, May 23, 1973, abandoned.

[30] Foreign Application Priority Data

May 25, 1972 [FR] France .................................. 72 18595

[51] Int. Cl.$^3$ ............................ C08F 4/64; C08F 4/68
[52] U.S. Cl. .................................. 502/169; 252/429 C; 526/137; 526/138; 526/144; 526/148; 526/151; 502/171
[58] Field of Search ............ 252/429 B, 429 C, 431 R

[56] References Cited

U.S. PATENT DOCUMENTS 3,094,568  6/1963  Hay et al. .................... 252/429 B X
3,392,159  7/1968  Schooley et al. ............... 252/431 X
3,424,736  1/1969  Nudenberg et al. ......... 252/429 B X
3,624,056  11/1971  Minchak ..................... 252/429 C X
3,814,743  6/1974  Tornquist et al. .......... 252/429 C X

FOREIGN PATENT DOCUMENTS 703847  2/1965  Canada .
2001549  12/1970  Fed. Rep. of Germany .
2010468  2/1970  France .
2099311  3/1972  France .
828201  2/1960  United Kingdom .
888855  2/1962  United Kingdom .

Primary Examiner—Patrick Garvin
Attorney, Agent, or Firm—McDougall, Hersh & Scott

[57] ABSTRACT

The invention is addressed to solid catalysts comprising essentially compounds of magnesium and of transition metals selected from the sub-groups IVa, Va and VIa of the periodic table, applicable to the polymerization of olefins and particularly ethylene, in which the catalyst is obtained by first preparing a solid compound of magnesium, monohalogenated hydrocarbon and halogen and/or organic derivatives of the transition metal in a state of valency of at least 4 and then reacting the solid compound of magnesium and transition metal with an oxidizing compound.

1 Claim, No Drawings

CATALYST FOR THE POLYMERIZATION OF OLEFINS BASED UPON MAGNESIUM AND TRANSITION METAL

CROSS REFERENCE TO RELATED APPLICATIONS

The present application is a continuation of application Ser. No. 63,123 (filed Aug. 3, 1979, now abandoned) which in turn is a continuation of application Ser. No. 850,230 (filed Nov. 11, 1977, now abandoned) which in turn is a continuation of application Ser. No. 363,037 (filed May 23, 1973, now abandoned).

The invention relates to solid catalysts for use in polymerizing olefins, and to a method of preparing such catalysts.

The catalysts of this invention are particularly suitable for polymerizing or copolymerizing olefins of the formula $CH_2=CHR$, wherein R is a hydrogen atom or an alkyl radical with a maximum of 8 carbon atoms, with a view to preparing polymers or copolymers having a molecular weight generally over 50,000. The catalysts may also be used for preparing polyolefin waxes of a molecular weight usually from 10,000 to 200,000. In either of these applications, the catalysts are particularly adapted to polymerizing ethylene, either alone or mixed with other olefins.

In French Pat. No. 2,116,698 for "Olefin-polymerizing Catalysts prepared from Magnesium" and in French Pat. No. 2,099,311 for "Magnesium-based Catalysts for Use in Polymerizing Olefins," description is made of catalysts for use in polymerizing olefins, the catalysts comprising compounds of magnesium and of transition metals from sub-groups IVa, Va and VIa of the periodic table. In general, the catalysts are prepared by reacting magnesium, in the metallic state, monohalogenated hydrocarbons and compounds of the transition metals, in the absence of any oxidants, such as oxygen.

Analysis of the above mentioned catalysts shows that they contain, in combined form, chiefly magnesium and transition metal or metals, in which at least a very high proportion of the transition metals are in a state of valency lower than they were during the preparation of the catalysts. For example, in catalysts prepared from compounds of tetravalent titanium, at least the greater part of the titanium is in the trivalent state.

Applicants have now discovered catalysts based on magnesium and transition metals, in which the preparation includes treatment with oxidizing compounds, whereby the transition metal or metals are, on an average, in a state of valency higher than their state of valency in the aforementioned catalysts. For example, when the catalysts are prepared from compounds of tetravalent titanium, at least a large proportion of the titanium is reduced to the trivalent state as an intermediate step, before being re-oxidized to the tetravalent state.

The object of this invention is the production of solid catalysts for use in polymerizing olefins, essentially comprising compounds of magnesium and of metals selected from the transition metals of sub-groups IVa, Va and VIa of the periodic table; in which the catalysts are obtained by a method comprising, in a first step, the preparation of a solid compound of magnesium and of a transition metal by reacting magnesium, monohalogenated hydrocarbons and halogen and/or organic derivatives of the said transition metal in a state of valency of at least four; and then in a second step, contacting the solid compound of magnesium and of transition metal with an oxidizing compound.

The transition metals from sub-groups IVa, Va and VIa of the periodic table comprise titanium, vanadium, chromium, zirconium, niobium, molybdenum, hafnium, tantalum, tungsten, thorium and uranium.

As representative of the derivatives of transition metals, used in the first stage of the method of this invention, reference can advantageously be made to compounds of tetravalent titanium, of the general formula $TiX_{4-m}(OR)_m$ in which X represents an atom of a halogen, usually chlorine, R an alkyl radical which may contain from 2 to 8 carbon atoms and m a whole number or a fraction which may have any value from 0 to 4. Examples of titanium compounds complying with this definition include titanium tetrachloride $TiCl_4$ or alkyl tetratitanates of the formula $Ti(OR)_4$. The compounds of the general formula $TiX_{4-m}(OR)_m$, in which m is neither 0 nor 4, may be obtained from calculated quantities of a titanium tetrahalide, of the formula $TiX_4$, by a functional interchange reaction which may be set out as follows:

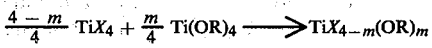

$$\frac{4-m}{4} TiX_4 + \frac{m}{4} Ti(OR)_4 \longrightarrow TiX_{4-m}(OR)_m$$

The derivatives of transition metals used in the first stage of the invention may also comprise vanadium halides such as vanadium tetrachloride.

The monohalogenated hydrocarbons are advantageously selected from chlorine or bromine derivatives of saturated aliphatic hydrocarbons. They may be represented by the general formula $C_nH_{2n+1}X$, in which X represents a chlorine or bromine atom and n an integer preferably from 1 to 12. The monohalogenated hydrocarbons may also be selected from cyclic derivatives or aromatic derivatives.

Use is made of preferably very pure magnesium in the form of a powder or turnings. To enable rapid initiation of the reaction between the magnesium, the monohalogenated hydrocarbons and the compounds of the transition metals without being preceded by a long period of induction, which would considerably impede industrial manufacture of the catalysts, the magnesium is reacted in active form, i.e. in a form substantially free from impurities, such as result from oxidation of the metal. In practice, commercial grade magnesium is activated either before being placed in the reaction medium or when it is actually in the medium. Preliminary activation of the magnesium may, for example, comprise crushing it while in an inert atmosphere or in an inert liquid such as an aliphatic solvent or treating the magnesium with iodine vapor. However, it is more expedient to activate the magnesium while within the reaction medium, for example by placing in the medium catalytic quantities of substances, such as iodine, or electron-emitting compounds, such as alcoholates of metals from sub-groups Ia, IIa and IIIa of the periodic table, alkyl titanates or ethers, particularly ethoxy ethane.

It is desirable to carry out the reaction between the magnesium, the monohalogenated hydrocarbons and the compounds of transition metals with the reagents present in quantities such that:

the ratio of the number of molecules of monohalogenated hydrocarbons to the number of magnesium atoms is within the range of 0.5 to 10:1 and preferably 2 to 4:1, and the ratio of the number of molecules of compounds of transition metals to the number of magnesium atoms is less than 0.5:1 and preferably less than 0.25:1.

In the preparation of the solid compound of magnesium and transition metal, the ratio of the number of molecules of monohalogenated hydrocarbon to the number of magnesium atoms has been found to affect the composition of the compound. When the ratio is less than approximately 1.5:1, the compound obtained contains organic radicals emanating from the monohalogenated hydrocarbon. When, on the other hand, the ratio is at least approximately 2:1 or more and, when the derivative of the transition metal used is a halide, analysis of the compound obtained no longer reveals the presence of any organic radicals.

It has also been observed that the more magnesium the reaction medium contains, the more the transition metal will be reduced during the reaction. Thus when the transition metal compound is a compound of tetravalent titanium, it has been found that the atomic ratio Ti/Mg must be at most about $\frac{1}{3}$ if the titanium is to be reduced completely to the trivalent state.

It is advantageous to react the magnesium with the monohalogenated hydrocarbons and compounds of transition metals in an inert liquid, which operates as a heat-regulator and thereby evens out the reaction. Liquid hydrocarbons and particularly aliphatic hydrocarbons, such as n-heptane, or mixtures of petroleum hydrocarbons are particularly suitable. The amount of inert liquid used may vary within broad limits, although in practice it is convenient to use an amount such that the reaction medium will contain from 10 to 500 g of magnesium per liter.

The reaction between the magnesium, monohalogenated hydrocarbons and transition metal compounds may be carried out in various ways. For example, the various components may be placed in an inert liquid at a temperature low enough to prevent the reaction from starting. The reaction mixture is then heated with stirring, if necessary, following the addition of an activating agent for the magnesium, such as an iodine crystal. It is then maintained at a temperature high enough to support the reaction, generally at from −20° to 150° C., for a period ranging from minutes to a number of hours. In another embodiment the various reagents, with the exception of either the magnesium or the monohalogenated hydrocarbon, are placed in the inert liquid, stirred and brought to a temperature high enough to initiate the reaction; the missing reagent is gradually added to the reaction medium and the reaction is continued as before.

The progress of the reaction may be observed by determining the quantity of transition metal compound in the liquid phase of the reaction medium. When the concentration of this compound becomes zero or constant, the reaction is over and the solid compound obtained may be washed with a solvent, such as one or more aliphatic hydrocarbons, until the halogenated compounds have virtually totally been washed out in the solvent. The solid compound can then be isolated and dried or kept suspended in solvent.

The oxidizing treatment, applied to the solid compound of magnesium and transition metal from the first stage of the process, may be carried out in various ways. Thus the solid compound may be put into contact with the oxidizing compound in an inert liquid, such as n-heptane or a petroleum solvent in which it is suspended. The inert liquid may, in particular, consist of the medium used for preparing the solid compound. The oxidizing compound is then dispersed in gaseous form in the inert liquid or dissolved in the liquid. More simply, the oxidizing treatment may be carried out by placing the solid compound of magnesium and transition metal in a substantially dry state in an atmosphere containing a gaseous oxidizing agent. This type of oxidizing treatment may be applied either by a static method, with the solid compound at rest in the oxidizing atmosphere, or by a dynamic method, e.g. while the solid compound is being pneumatically conveyed by a propelling oxidizing gas or while it is being fed into an olefin-polymerizing reactor.

The oxidizing compound preferably consists of atomic or molecular oxygen, in pure form or in the form of a gaseous mixture, such as dry air. Alternatively, it may be a halogen such as chlorine, bromine or iodine.

As a matter of convenience, the oxidizing treatment is generally carried out at about ambient temperature or slightly above. The duration of the oxidizing treatment depends on the nature of the compound of magnesium and transition metal, the nature of the oxidizing agent and the temperature. For example, virtually complete oxidation by oxygen in the air of a compound of magnesium and titanium, prepared from titanium tetrachloride, would take about 20 hours at around 20° C. At a temperature of around 100° C., the time can be reduced to 8 hours. When incomplete oxidation of the transition metal is required, it is necessary to limit either the duration of treatment or the amount of oxidizing compound used. The second method is preferable when a precise rate of oxidation of the transition metal compound is desired.

It is also possible to subject the catalyst or the solid compound of magnesium and transition metal to a physical treatment in order to modify its physical form and to provide solid particles of a specific size. The physical treatment may be applied to the catalyst itself or to the solid compound of magnesium and transition metal, or while the solid compound is being oxidized. The physical treatment may, in particular, consist of crushing and elutriation, e.g. in a stream of gas such as oxygen or air, with a view towards classifying for selection of particles between two specified size limits. Such catalysts of a selected particle size are particularly appropriate for polymerizing olefins in the gaseous phase.

The catalysts of this invention are generally in the form of finely divided solids. Analysis shows them to contain in particular, in combined form, magnesium without any reducing properties and transition metal in a state of valency higher than its valency in the solid compound of magnesium and transition metal. In the case of catalysts based on titanium or vanadium, the transition metal contained therein is largely in the tetravalent state.

As indicated above, the catalysts may also contain organic radicals.

The catalysts of the invention are characterized by very great catalytic activity in the polymerization of olefins, either in the presence of a liquid dispersing agent or in gaseous phase. Their marked catalytic activity makes them altogether different from catalysts based on halides of reduced transition metals, such as titanium trichloride. When the transition metal has been completely oxidized, the catalysts of the invention have the further advantage of being particularly convenient to use because of their insensitivity to oxygen, unlike the previously known catalysts mentioned above. Consequently they can be stored, weighed and fed into polymerizing reactors without the need to take any special precautions. Their convenience is further increased by the fact that they can easily undergo additional physical treatment such as grinding or elutriation.

The catalysts of this invention can be used for polymerizing or copolymerizing olefins such as ethylene and/or olefins of the formula $CH_2=CHR$ in which R represents an alkyl radical having from 1 to 8 carbon atoms. In this type of polymerization, the catalysts of this invention are preferably employed in association with co-catalysts selected from organometallic compounds of the metals from groups II and III of the periodic table, such as organoaluminum compounds of the average formula $AlR_nX_{3-n}$, in which R represents hydrogen and/or an alkyl group having 1 to 10 carbon atoms, X a halogen atom, preferably chlorine, and n a whole number or a fraction of any value from 1 to 3. The co-catalysts are advantageously used in quantities such that the molar ratio of metals from groups II and III in the co-catalysts to transition metals from subgroups IVa, Va and VIa in the catalysts is within the range of 1:1 to 50:1.

The catalysts of this invention are particularly suitable for polymerizing olefins by the so-called "low pressure" method, which generally consists of operating at a pressure below 20 bars and a temperature of from 40° to 150° C. Polymerization may take place in a liquid in which the catalyst is dispersed, which liquid may be the liquefied monomer or a saturated aliphatic hydrocarbon. Alternatively, polymerization may take place in gaseous phase in the absence of any liquid diluent. While polymerization is going on, it is possible to influence the average molecular weight of the polymer being formed, by means of a chain-limiting agent such as hydrogen, which is introduced in molecular proportions generally within the range of 10% to 80% relative to the olefin being polymerized. Polymerization is stopped when the polymer reaches the desired average molecular weight, which is usually from 50,000 to 1,000,000 in the case of polymers intended for the usual applications of thermoplastic materials or generally from 10,000 to 200,000 in the case of polyolefin waxes. Because of the high degree of activity of the catalysts of this invention, the polymers obtained contain only small quantities of transition metals and can be put to their final use without having to undergo any purifying treatment.

EXAMPLE 1

(a) Preparation of the catalyst

A 5 liter stainless steel reactor, equipped with a mechanical agitator, a reflux condenser and means for heating or cooling, is filled with dry nitrogen. The following are introduced successively at ambient temperature:

24.3 g (1 gram atom) of powdered magnesium
47.5 g (250 millimoles) of titanium tetrachloride
2.6 g (20 gram milliatoms) of iodine
n-heptane in an amount to bring the volume to 800 ml.

The reaction medium is stirred and brought to 80° C., then 185 g (2 moles) of n-butyl chloride is introduced over a period of 20 minutes.

The reaction medium is then maintained at 90° C. for 5 hours.

The solid precipitate is decanted and the supernatant liquid is withdrawn and replaced with clean n-heptane.

A brownish-black precipitate is obtained having the following composition by weight:

Ti=9.1%; Mg=19.8%; Cl=71.1%

Analysis of the precipitate reveals that the titanium contained therein is virtually all in the trivalent state.

The previous precipitate, in suspension in n-heptane, is then introduced with agitation in a 1 liter glass flask equipped with a mechanical agitator. From a tubing discharging into the bottom of the flask, dry air is then bubbled through at a rate of 120 l/h for 8 hours, at ambient temperature. The oxidized solid is washed with n-heptane. Analysis of the resultant catalyst shows the titanium contained therein to be virtually all in the tetravalent state.

(b) Polymerization of ethylene

Two liters of n-heptane is placed at room temperature in a 5 liter stainless steel reactor having a mechanical agitator provided with a nitrogen atmosphere. When the n-heptane has been heated to 70° C., the following are introduced:

0.79 g (4 millimoles) of tri-isobutyl aluminum
an amount of catalyst corresponding to 0.5 gram-milliatom of titanium.

The reaction medium is heated to 80° C. and hydrogen is introduced until a pressure of 3.5 bars is obtained, after which ethylene is fed in at 160 g/h. After 7 hours of polymerization, at a maximum total pressure of 5 bars, 1,100 g of a polyethylene is obtained, with a titanium content of 22 parts per million by weight and a fluidity value of 6.5 at 190° C., under a load of 2.16 kg.

(c) Comparative test

By way of comparison, 2 g (10 millimoles) of titanium trichloride is suspended in 500 ml of n-heptane in a 1 liter glass flask. The titanium trichloride is oxidized as described in paragraph 1/a, by bubbling dry air into the suspension of titanium chloride at a rate of 120 l/h for 3 hours at room temperature.

The titanium trichloride then takes on a fluffy appearance.

The ethylene is polymerized as described in paragraph 1/b. When hydrogen has been introduced to a pressure of 2 bars, ethylene is fed in at a rate of 160 g/h. Polymerization is not initiated until the pressure in the reactor reaches 10 bars, and the flow rate of absorbed ethylene decreases rapidly.

After 6 hours of polymerization, 110 g of a flaky-looking polyethylene is obtained, having a very low apparent mass per unit volume (0.22 g/cm$^3$) and a residual titanium content of 215 ppm.

EXAMPLE 2

(a) Preparation of the catalyst

The procedure is the same as in Example 1 except that the following substances are placed in the reactor at room temperature:

24.3 g (1 gram atom) of powdered magnesium
23.75 g (125 millimoles) of titanium tetrachloride
35.55 g (125 millimoles) of n-propyl titanate
n-heptane in an amount to bring the volume to 800 ml.

The reaction medium is then stirred and brought to 80° C. 185 g (2 moles) of n-butyl chloride is pumped into the reactor over a period of 5 hours, after which the reaction medium is maintained at 80° C. for 30 minutes.

The solid precipitate is decanted and the liquid, which was above it, is withdrawn and replaced with clean n-heptane.

The brownish-black precipitate obtained has the following composition by weight:

Ti=8.4%; Mg=17.0%; Cl=53.0%; organic residues=21.6%.

The solid precipitate is then oxidized as in Example 1.

(b) Polymerization of the ethylene

The procedure is the same as in Example 1/b except that hydrogen is introduced at a pressure of 2 bars. 1,090 g of a polyethylene, containing 23 ppm of titanium, is obtained. The fluidity value of the polymer at 190° C. and under 2.16 kg is 5.6; its breadth of molecular distribution, expressed by the ratio (MW/Mn) is in the region of 4; and its apparent mass per unit volume (M.V.A.) is 0.43 g/cm$^3$. ($M_W$ is the average molecular weight expressed as the weight of the polymer; $M_n$ is its average molecular weight expressed as a number).

EXAMPLE 3

(a) Preparation of the catalyst

The procedure of Example 2/a is followed, except that oxidation is carried out by bubbling in pure oxygen at room temperature, at a rate of 20 l/h for 4 hours.

(b) Polymerization of the etylene

The procedure is the same as in Example 2/b. 1,050 g of a polyethylene containing 24 ppm of titanium is obtained. Its apparent mass per unit volume is 0.41 g/cm$^3$ and its fluidity value under 2.16 kg is 4.8.

EXAMPLE 4

(a) Preparation of the catalyst

A non-oxidized solid precipitate is prepared under the same conditions as in Example 2/a. The precipitate is then placed in a 2 liter glass flask in a nitrogen atmosphere. The following are stirred into the flask at room temperature:

60 g of twice sublimed iodine, and
500 ml of n-heptane.

The mixture is agitated for 8 hours, then the solid is washed several times with n-heptane. Analysis shows 80% of the titanium in the catalyst to be oxidized to the tetravalent state.

(b) Polymerization of the ethylene

The method of Example 2/b is followed. 1,120 g of a polyethylene, containing 20 ppm of titanium, is obtained. Its apparent mass per unit volume is 0.42 g/cm$^3$ and its fluidity value under 2.16 kg is 2.6.

EXAMPLE 5

(a) Preparation of the catalyst

The method of Example 2/a is used, except that the solid precipitate is oxidized with chlorine, which is fed into the flask at a rate of 12 l/h for 4 hours.

The catalyst is then washed several times with n-heptane. Analysis shows 96% of the titanium in the catalyst to be oxidized to the tetravalent state.

(b) Polymerization of the ethylene

The procedure of Example 2/b is followed. 1,120 g of a polymer, containing 21 ppm of titanium, is obtained. Its apparent mass per unit volume is 0.37 g/cm$^3$ and its fluidity value under 2.16 kg is 1.

EXAMPLE 6

(a) Preparation of the catalyst

The procedure is the same as in Example 1/a except that the titanium tetrachloride is replaced by 48.2 g (250 millimoles) of vanadium tetrachloride and all the reagents are used simultaneously, including the n-butyl chloride. The reaction medium is maintained at 80° C. for 2 hours, after which the brownish-black precipitate obtained is oxidized, as described in Example 2/a.

(b) Polymerization of the ethylene

The method of Example 2/b is used.

After 2 hours of polymerization, 300 g of a polyethylene is obtained, with a fluidity value of 0.3 under 5 kg.

EXAMPLE 7

(a) Preparation of the catalyst

A non-oxidized solid precipitate is prepared as described in Example 2/a. After drying under vacuum, the solid is oxidized with dry air and simultaneously crushed, the particles obtained having a diameter of less than 5 microns.

(b) Polymerization of the ethylene

The method of Example 2/b is used. 1,150 g of a polyethylene is obtained, containing 22 ppm of titanium, with an apparent mass per unit volume of 0.38 g/cm$^3$ and a fluidity value under 2.16 kg of 4.

EXAMPLE 8

(a) Preparation of the catalyst

A solid precipitate is prepared under the same conditions as in Example 2/a.

The precipitate obtained is dried under vacuum and is then classified in air with simultaneous oxidation. The selection is carried out in a glass tube 60 mm in diameter and 60 cm high, provided in the lower portion with a plate of fritted glass; a stream of dry air is passed upwardly through the tube at 5 l/minute, the air being at a temperature of 20° C.

The fine particles carried by the air stream are collected in a cyclone. Two hours later, 95 g of a catalyst made up of particles of over 25 microns in diameter is collected on the fritted glass. The titanium contained in the catalyst is all in the tetravalent state.

(b) Polymerization of the ethylene

The method of Example 2/b is followed, 1,100 g of a polyethylene, containing 22 ppm of titanium, is obtained. Its apparent mass per unit volume is 0.39 g/cm$^3$ and its fluidity value, at 190° C. and under a load of 2.16 kg, is 5.6.

EXAMPLE 9

Two liters of n-heptane is placed at room temperature in a 5 liter stainless steel reactor provided with a mechanical agitator, and a nitrogen atmosphere.

When the n-heptane has been heated to 60° C., the following are introduced:

0.6 g (5 millimoles) of diethylaluminum chloride
an amount of catalyst, prepared as in Example 2/a, corresponding to 2 gram-milliatoms of titanium.

The reaction medium is maintained at 60° C. and hydrogen is introduced until a pressure of 0.5 bar is obtained, then propylene is fed in at a high enough rate to keep the pressure at 5.5 bars during polymerization.

After 6 hours of polymerization 640 g of a polypropylene wax is obtained.

We claim:

1. The method of preparing pre-oxidized solid catalysts which can be used in the polymerization of olefins having the formula $CH_2=CHR$ in which R is hydrogen or an alkyl group containing 1 to 8 carbon atoms consisting essentially of reacting magnesium, a monohalogenated hydrocarbon selected from the group consisting of chlorine and bromine derivatives of a saturated hydrocarbon and a transition metal compound having the general formula $MX_{4-m}(OR)_m$ wherein X is chlorine, R is an alkyl group having from 2 to 8 carbon atoms, m is a whole number or fraction thereof from 0 to 4 and M is a transition metal selected from the group consisting of titanium and vanadium at a temperature within the range of $-20°$ to 150° C. for a time sufficient to react the magnesium, monohalogenated hydrocarbon and the compound of the transition metal, and then contacting the solid magnesium and transition metal compound resulting from the previous reaction with an oxidizing compound selected from the group consisting of chlorine, bromine and iodine to completely convert the transition metal to its original valence, in which the magnesium, monohalogenated hydrocarbon and transition metal compound are reacted in amounts such that:

(a) the ratio between the number of molecules of the monohalogenated hydrocarbon and the number of magnesium atoms is within the range of 0.5 to 10, and (b) the ratio between the number of molecules of transition metal and the number of magnesium molecules is less than 0.5 whereby the activity of the catalyst after oxidation is not substantially modified and the oxidized catalyst can be stored and used in the presence of air.

* * * * *